United States Patent [19]

Karcher et al.

[11] 4,189,023
[45] Feb. 19, 1980

[54] HYDRAULIC STEERING LIMIT CONTROL

[75] Inventors: Karl-Friedrich Karcher, Lorch; Otto Merkle, Schwabisch Gmund, both of Fed. Rep. of Germany

[73] Assignee: Zahnradfabrik Friedrichshafen AG, Friedrichshafen, Fed. Rep. of Germany

[21] Appl. No.: 968,413

[22] Filed: Dec. 11, 1978

[30] Foreign Application Priority Data

Dec. 13, 1977 [DE] Fed. Rep. of Germany ....... 2755420

[51] Int. Cl.$^2$ .................... B62D 5/08; F15B 11/08
[52] U.S. Cl. .................... 180/132; 91/400; 91/451
[58] Field of Search .............. 91/400, 404, 405, 451, 91/466; 180/132, 139, 152, 153

[56] References Cited

U.S. PATENT DOCUMENTS

| | | | |
|---|---|---|---|
| 3,878,763 | 4/1975 | Lang | 180/139 |
| 3,945,457 | 3/1976 | Olsen | 91/400 |
| 3,968,733 | 7/1976 | Lang | 91/451 |
| 4,006,662 | 2/1977 | Olsen | 91/451 |

*Primary Examiner*—Joseph F. Peters, Jr.
*Assistant Examiner*—Donn McGiehan
*Attorney, Agent, or Firm*—Zalkind & Shuster

[57] ABSTRACT

In an auxiliary power steering system, a steering linkage actuated limit valve assembly is maintained depressurized in its inactive state by one-way check valves blocking flow from the pressurized chambers of the steering servomotor and by by-pass valves which control the connection of the differential pressure operated valve to the vented chambers of the servomotor.

6 Claims, 1 Drawing Figure

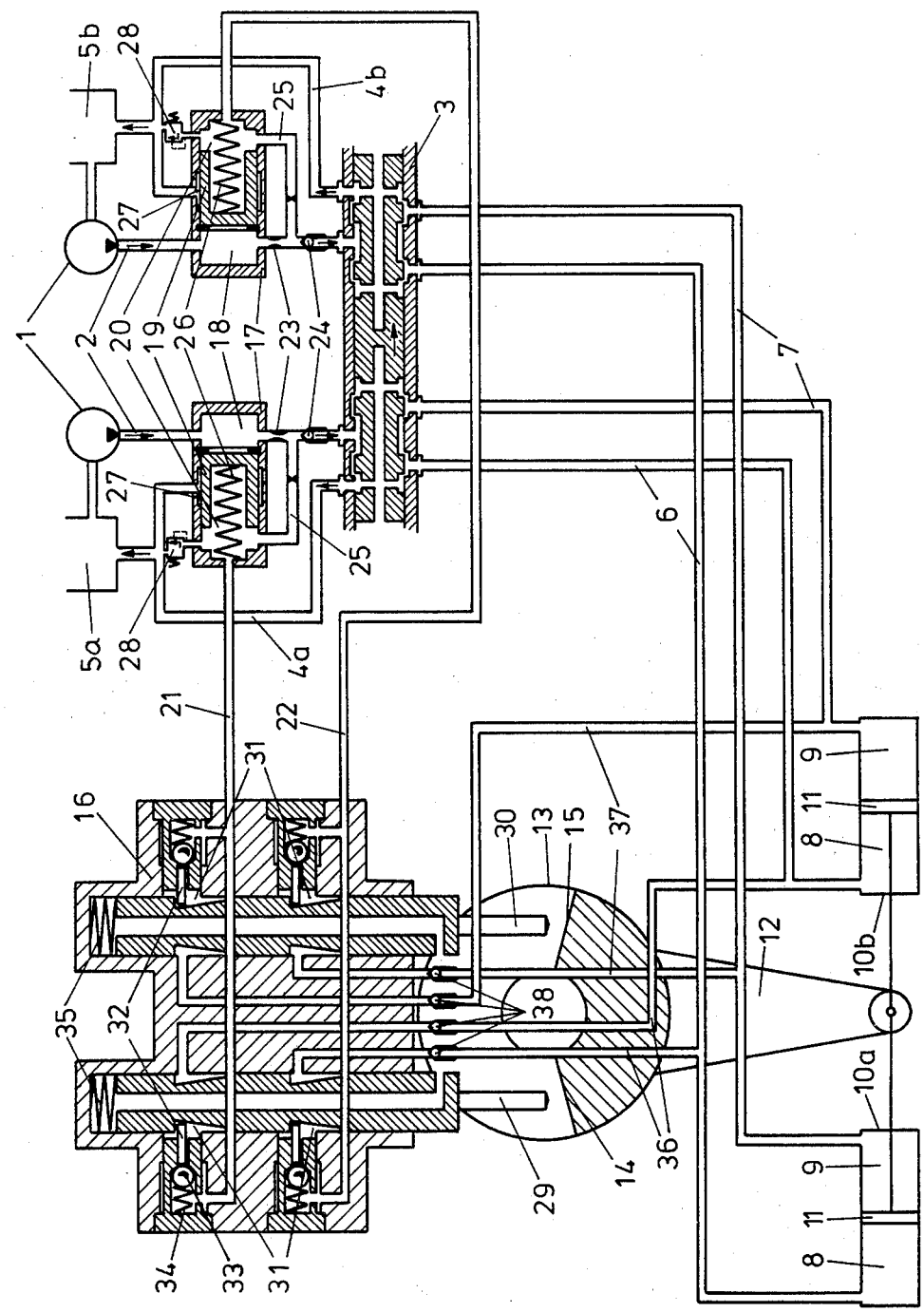

HYDRAULIC STEERING LIMIT CONTROL

BACKGROUND OF THE INVENTION

This invention relates to hydraulic steering limit valves for an auxiliary power steering system of a motor vehicle operative to shut off auxiliary power in the end deflection positions of the dirigible wheels of the vehicle.

Power steering limit valves are generally known and include a spring-loaded plunger operated by the steering shaft and continuously in fluid communication with pressure chambers of the servomotor and with a pressure operated valve in the end deflection positions of the dirigible wheels to form a short circuit between the servo pump supplying pressurized fluid to the steering circuit and the reservoir tank of the steering circuit. Simultaneously with the establishment of the short circuit by the plunger, fluid communication is established between the pressure operated valve and the corresponding pressure chamber of the servomotor to maintain it depressurized. Such a steering limit valve assembly is disclosed in U.S. Pat. No. 3,968,733, owned by the assignee of the present application.

The prior steering limit valve assembly aforementioned, is continuously under pressure to create a sealing problem since fluid leakage will result in functional failure. Further, application of prior steering limit valves to two or more steering circuits was not feasible because of costs.

It is therefore an important object of the present invention to provide a hydraulic steering limit valve assembly which will operate more reliably and also be suitable for several steering circuits.

SUMMARY OF THE INVENTION

According to the present invention, the linkage actuated plungers associated with a steering limit valve assembly are provided with external notches, the depth of which decreases in a direction opposite to the direction of plunger displacement against a spring bias. One-way check valves connect the pressure chambers of the servomotors to the notches, while a valve actuating pin projects into each notch to operate a spring-loaded by-pass valve that is connected to the differential pressure operated valve associated with the steering limit control system. As a result of the foregoing features of the limit control system, in accordance with the present invention, the steering limit valve assembly is internally vented in its inactive state since by-pass valves block operating pressure fluid while the one-way check valves block flow from the opposing pressure chambers of the servomotors. Accordingly, there is no sealing problem with the steering limit valve assembly of the present invention. Only when a plunger is actuated by the steering shaft in its limit position, does operating pressure prevail in the steering limit valve assembly. The foregoing is achieved by the notches of variable depth on the plunger. As a result, a corresponding valve operating pin actuates a by-pass valve to vent the differential pressure operated valve through a short circuit to the reservoir tank of the steering circuit.

The steering limit control system of the present invention is suitable for both single steering circuits as disclosed in U.S. Pat. No. 3,968,733 aforementioned and for two or more steering circuits. For plural steering circuits, it is only necessary that a corresponding number of by-pass valves and assigned conduits be provided.

According to one simple embodiment of the invention, each of the by-pass valves aforementioned includes a ball valve element biased to a closed position by a spring, the by-pass valves being physically associated with the steering limit valve assembly.

In applying the present invention to two or more steering circuits, an advantageous feature of the invention resides in the provision of a single plunger actuated by the steering linkage in one limit position for all steering circuits, and wherein each plunger is provided with a number of notches and by-pass valves corresponding to the number of servomotors or steering circuits. Two plungers are always required regardless of the number of steering circuits, and each plunger need only be provided with a corresponding number of notches and by-pass valves to accomodate all of the steering circuits.

In accordance with another aspect of the invention, each steering circuit has a separate servo pump, reservoir tank and differential pressure operated valve through which the servo pump is vented in the limit positions of the steering shaft or dirigible wheels.

BRIEF DESCRIPTION OF THE DRAWING FIGURE

An embodiment of the invention is hereafter described with reference to the drawing which depicts two interrelated steering circuits with which the present invention is associated.

DETAILED DESCRIPTION OF PREFERRED EMBODIMENT

The drawing illustrates a two-circuit steering system for a motor vehicle of the auxiliary hydraulic power type wherein manual rotation of a steering shaft 13 is assisted by fluid pressure acting upon a pair of servomotors 10a and 10b interconnected with the dirigible wheels of the vehicle through steering linkages. The two steering circuits as depicted in the drawing are identical and each includes a servo pump 1 connected by a pressure supply line 2 to a control valve 3. Reservoir tanks 5a and 5b respectively associated with the two circuits, are connected to the suction sides of the servo pumps 1 and are connected to the steering control valve 3 by return lines 4a and 4b. Two outlet lines 6 and 7 extend from the control valve 3 to the opposing pressure chambers 8 and 9 of each servomotor 10a and 10b. The pistons 11 associated with the servomotors are interconnected with the steering shaft 13 by means of a steering lever 12 to thereby assist mechanical steering initiated by a steering spindle (not shown) connected to the steering shaft. A pair of abutments 14 and 15 are provided on the steering shaft 13 for actuation of a two-section steering limit valve assembly 16, whenever an end limit position of the steering linkage or dirigible wheels is reached. Each steering circuit also has associated therewith similar differential pressure operated valves 17 continuously subject to servo pump line pressure in a pressure chamber 18 connected to the pump pressure line 2. Each differential pressure operated valve 17 has a spring loaded piston 19 separating the pump pressure chamber 18 from a control pressure chamber 28 connected by pressure control lines 21 or 22 to the pressure limit valve assembly 16. Restrictors 23 and check valves 24 are provided in series in the supply lines between the chamber 18 and the control valve 3. A restricted flow line 25 interconnects the chamber 20 with the pressure supply line between the restrictor 23 and check valve 24. Whenever a predetermined differential pressure exists between fluid in chambers 18 and 20, the piston 19 is displaced against the continuous bias of a spring 26 in order to vent chamber 18 by establishing fluid communication through annular passage groove 27 between the chamber 18 and the reservoir return line 4a or 4b. A pressure limiting relief valve 25 is disposed between the control pressure chamber 20 and the return line 4a or 4b. The pressurized fluid supplied to the control valve 3 is distributed in a customary manner to the servomotors 10a and 10b through the outlet lines 6 and 7. One of said outlet lines is vented by connection to a return line 4a to 4b while the other outlet line is pressurized in order to directionally control displacement of the servomotors.

The two-section steering limit valve assembly 16 comprises a lower valve body portion which is hydraulically connected to one steering circuit through control line 22 and an upper valve body portion which is connected by control line 21 with the other steering circuit. The two control lines 21 and 22 respectively extend from the pressure control chambers 20 of the differential pressure operated valves 17. For a three-circuit steering system, it will be apparent that one additional control line will be provided connected to the third steering circuit.

The steering limit valve assembly also includes a pair of plungers 29 and 30 which are engageable by the abutments 14 and 15 in the limit positions of the steering shaft 13. Each of the plungers 29 and 30 has two axially spaced notches 31 formed thereon corresponding to the two steering circuits and the depth of each notch 31 decreases in a direction opposite to the direction of plunger displacement. A valve actuating pin 32 is slidably received within each notch and forms part of a by-pass valve associated with each notch. Each pin 32 is engageable with a ball valve element 33 biased to a closed position by a spring 34. The springs 34 are disposed within valve chambers in fluid communication with a pressure control line 21 or 22.

The plungers 29 and 30 are displaceable in an upward direction as viewed in the drawing against the bias of springs 35. The valve passages formed by the notches 31 in the valve body of the valve assembly 16 are in fluid communication with conduits 36 and 37 through one-way check valves 38. The conduits 36 and 37 are branches of the outlet lines 6 and 7 extending from the control valve 3 to the servomotor chambers.

Assuming operating pressure is supplied to the pressure chambers 9 of each of the two servomotors 10a and 10b through outlet lines 7 from the control valve 3 while the chambers 8 are vented through the outlet lines 6, the steering lever 12 will be displaced in a left hand direction or clockwise as viewed in the drawing. Upon reaching the limit position, the abutment 14 on the steering shaft displaces the plunger 29 upwardly causing two of the left hand pins 32 to actuate the ball valve elements 33 associated therewith. These ball valve elements which otherwise block fluid flow from the control pressure chambers 20, are opened so that the operating pressure built up in the chambers 20 will be applied through control lines 21 and 22 and the by-pass valves to the left hand portion of the valve assembly 16. The conduits 36 are accordingly pressurized by opening of two of the check valves 38 leading to the vented chambers 8 of the two servomotors 10a and 10b. As a result, the connection established by the control lines 21 and 22 with the conduits 36 because of plunger movement effects a reduction in pressure in chambers 20 of the two differential pressure operated valves 17. The differential pressure pistons 19 are therefore displaced against the bias of springs 26 so as to vent the chambers 18 through the annular passage grooves 27. In this manner, the previously pressurized chambers 9 of the servomotors are depressurized and vented chambers 8 are maintained depressurized to disable any fluid steering assist action.

The check valves 24 in the pump pressure lines, enable subsequent pressure buildup in the chambers 20 and the two control lines 21 and 22 once the steering shaft is displaced from its limit position. The spring biases associated with the check valves 38 may be adjusted in order to maintain a predetermined residual pressure in the servomotors. As a result, the dirigible wheels in their limit position will still be subject to a certain degree of hydraulic constraint.

What is claimed is:

1. A hydraulic steering limit control for a vehicle power steering system having at least one steering limit valve (16) cutting off auxiliary power in the limit positions of the dirigible vehicle wheels, wherein said limit valve is operated by a steering shaft and is continuously connected to a steering circuit associated with a servomotor (10) having opposing pressure chambers (8 and 9) and a pressure operated valve (17) controlling a servo pump (1) supplying pressure fluid to the circuit, whereby the servo pump is vented in response to the dirigible wheels reaching said limit positions, the improvement residing in the steering limit valve including spring-loaded actuator means (29, 30) operatively engageable by said steering shaft for displacement in one direction and having notches (31) formed therein of a depth increasing in said one direction of displacement, one-way valve means (38) connecting the pressure chambers of the servomotor to said notches, by-pass valve means (33, 34) connecting each of said notches to the pressure operated valve, and valve operating means (32) projecting into the notches for opening the by-pass valve means in response to displacement of the actuator means in said one direction.

2. The combination of claim 1 wherein said by-pass valve means includes a ball (33) and a spring (34) biasing the ball to a valve closing position.

3. A hydraulic steering limit control for at least two steering circuits as defined in claim 1 wherein said actuator means includes a single plunger for each of said circuits displaced by the steering shaft in one of the limit positions thereof, said notches and by-pass valve means corresponding in number to the pressure chambers interconnected therewith by the one-way valve means.

4. The combination of claim 3 wherein each of the steering circuits has one of said differential pressure operated valves associated therewith.

5. The combination of claims 1, 2, 3 or 4 wherein the one-way valve means (38) is operative to maintain a residual pressure in the servomotor.

6. In a vehicle steering system having a source of fluid under pressure (1) connected by a control valve (3) to opposing chambers (8 and 9) of a servomotor (10) and means for limiting operation of the servomotor by a limit valve assembly (16) displaced from an inactive position when the servomotor reaches a limit position to connect one of the opposing chambers vented through the control valve to a differential pressure actuated valve (17) causing venting of the source;

the improvement residing in means for maintaining the limit valve assembly depressurized in the inactive position thereof, comprising one-way valve means (38) for blocking flow of fluid from the opposing chambers under pressure to the valve assembly, by-pass valve means (33) for blocking flow of fluid from the differential pressure actuated valve to the limit valve assembly in the inactive position thereof, and means (31-32) responsive to displacement of the valve assembly in the limit position of the servomotor for actuating the by-pass valve means to establish fluid communication between the differential pressure actuated valve and the vented chamber.

* * * * *